United States Patent [19]
Gill et al.

[11] Patent Number: 4,561,424
[45] Date of Patent: Dec. 31, 1985

[54] NONTRACKING PARABOLIC SOLAR ENERGY COLLECTOR APPARATUS

[75] Inventors: Michael T. Gill, Sugarland; Mark C. Rogers, Baytown, both of Tex.

[73] Assignee: Advanced Solar Systems, Midland, Tex.

[21] Appl. No.: 756,541

[22] Filed: Jul. 19, 1985

[51] Int. Cl.$^4$ .................................. F24J 3/02
[52] U.S. Cl. ..................... 126/438; 126/443
[58] Field of Search ............ 126/438, 439, 443, 442, 126/448, 900, 417, 450; 350/293

[56] References Cited

U.S. PATENT DOCUMENTS

| | | | |
|---|---|---|---|
| 4,038,964 | 8/1977 | Drew | 126/438 |
| 4,080,954 | 3/1978 | de Wilde et al. | 126/443 |
| 4,099,516 | 7/1978 | Caulier | 126/438 |
| 4,308,857 | 1/1982 | Sims | 126/443 |
| 4,440,156 | 4/1984 | Takeuchi et al. | 126/443 |

*Primary Examiner*—Randall L. Green
*Attorney, Agent, or Firm*—Edwin E. Greigg

[57] ABSTRACT

A mirror collector having a generally parabolic surface terminating near the vertex in a circular or cylindrical curve, an evacuated cylindrical heat entrapment tube composed of a clear glass for energy admission and two pair of elongated heat collector tubes centrally located in the heat entrapment tube for passing an inner fluid to be heated. The two pair of heat collector tubes are constructed of copper with a selective absorption coating for receiving heat and positioned so that the mirror collector concentrates substantially all incoming energy upon the central heat collector tubes.

6 Claims, 4 Drawing Figures

NONTRACKING PARABOLIC SOLAR ENERGY COLLECTOR APPARATUS

CROSS REFERENCE TO RELATED APPLICATION

This application is an improvement over copending applications Ser. No. 640,068 filed Aug. 13, 1984, now U.S. Pat. No. 4,543,946, and application Ser. No. 650,470 filed Sept. 14, 1984, now U.S. Pat. No. 4,529,831.

BRIEF SUMMARY OF THE INVENTION

The present invention relates to and describes the operating principles and fabrication of a non-tracking compound parabolic solar collector which is an improvement over the collector set forth in the copending applications. The improvement resides in the collector fluid tube, the mirror surface and the supporting structure. The curvature of the mirror design is the same as set forth in the copending applications.

The mirror design is based on the ability of a parabolic surface to concentrate all incoming radiation onto its focal point. This particular mirror is comprised of two indentical parabolic sections rotated symmetrically off the optical axis of the collection trough. This parabolic curve is continuous to within about three degrees (3°) of the exact center of the trough at which point it seemingly degenerates to a circular curve. The focal point of each side of the curve is a point in the opposite side about one-half inch ($\frac{1}{2}$") above the bottom and about one-quarter inch ($\frac{1}{4}$") from the vertical center line of the curve. Thus a focal plane is created about one-half inch ($\frac{1}{2}$") from the bottom of the curve. By nesting a heat collector in the focal plane of the mirrors, all incoming energy will be concentrated onto the surface of the heat collector.

FIELD OF THE INVENTION

The purpose, advantage and feature of the invention is that it provides a concentrating solar collecting panel or panels constructed upon more or less a parabolic curve comprised of two identical halves made made to approximate a straight parabolic curve and then which are arranged in mating relation to resemble a parabolic curve, each half of the trough composed of a paraboloid essentially, and in which the bottom of the trough has disposed therein nesting relation a circular or tubular collecting element or tube that will actually have heat absorbing fluid passing through it such as hydrocarbon or silicon fluids as well as any available super high temperature responsive fluid used in industrial applications. The axis of the circular heat entrapment tube coalesces generally with a line formed by the focal point of the parabolic curves so that there is essentially created a focal plane disposed within the circular heat entrapment tube. The curve comprising the parabolic surface is about 2-3 degrees off center at the bottom of the curve, and the contour of the curve may be computed and plotted so that it achieves maximized focusing in the contour shaped structure of each half. The circular heat entrapment tube may be of glass having its diameter about $1\frac{1}{2}$ inches, and its center coalesces or coincides with the line of focal points. Inside the circular heat entrapment tube there is placed heat conductive fluid flow tubes joined at one end by a 180 degree bend and made of metal or copper that actually has the working fluid passing through them and is supported within the circular heat entrapment tube by conventional means. The interior surface of the circular heat entrapment tube is coated with a material for retroflecting or reflecting back into the tube all infrared radiation so that it is not lost into the parabolic surface and back out of the trough.

SUMMARY OF THE INVENTION

An object and objects of the invention are that it provides a new, improved and effective nontracking parabolic collector of solar energy.

A further object of the invention is to provide a combination of collector tube, a parabolic mirror surface and a metallic or copper tube of an improved configuration disposed at the focal point of the mirror surface which receives solar energy that is transferred into heat received by a high energy work fluid so that it is carried to a heat exchange unit by a header.

A further object of the invention is to provide a fabrication of a mirror structure that is long enduring while in situ and provides maximized efficiency of heat exchange from the solar energy to a high temperature responsive exchange of energy from solar energy to heat so that the heat can be processed in a heat exchange unit.

A further object of the present invention is to provide a collector tube composed of a clear glass outer tube for energy admission and in which vertical and horizontal tubes of metal of generally rectangular cross section has a selective absorption coating for receiving heat and through which there passes a high heat responsive material sensitive to solar energy received therein and for conveying the heat to a heat exchange unit. The heat entrapment tube of glass may have its inner surface with or without a separate coating thereon for retroreflecting infrared and other forms of heat back onto the inner tube so that no heat is lost from the trough to its exterior after having been received for collection therein.

A further object of the invention is to provide a heat collector with an outer tube that maintains an even heat distribution and for refocusing energy radiated from the inner and fluid containing tube from the collector cylinder tube onto the inner tube.

BRIEF DESCRIPTION OF THE SEVERAL VIEWS OF THE DRAWINGS

The above and other objects and advantages of the invention will become apparent upon full consideration of the following detailed description and accompanying drawings in which.

DETAILED DESCRIPTION OF THE PREFERRED EMBODIMENT

Figure 1:
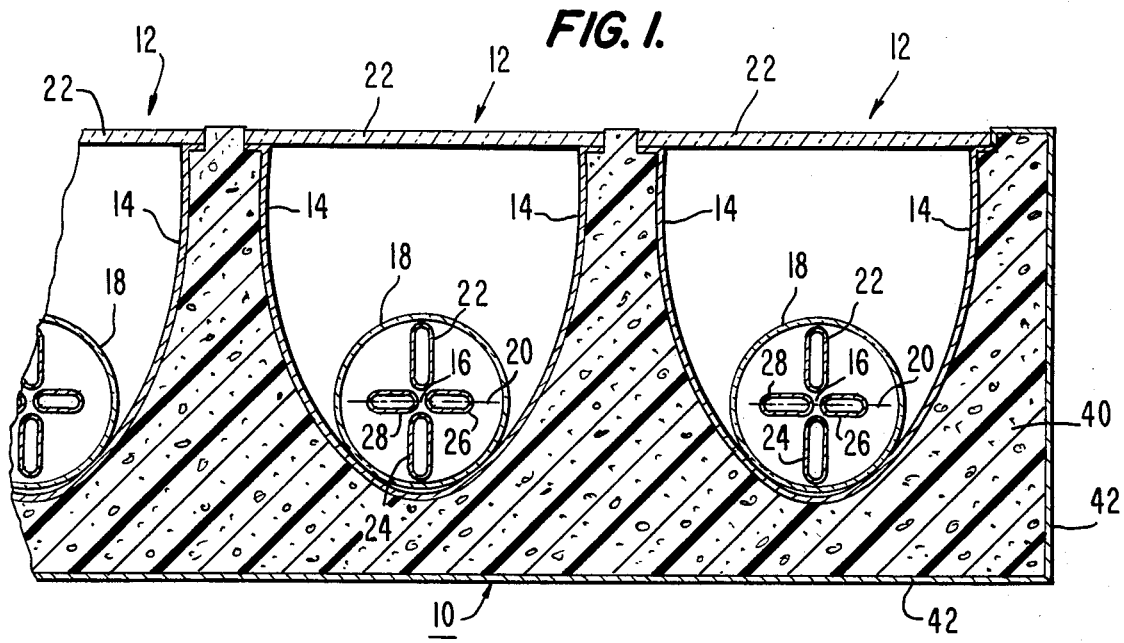
FIG. 1 is a partial cross sectional view showing features and details of the preferred embodiment of the invention.

Referring now to the drawings there is shown a solar energy collection apparatus 10 for providing nontracking parabolic collection of solar energy and including a series of parallel troughs 12, 12, 12 arranged in an array disposed in a manifold and support structure forming an integral unit as shown in the copending applications.

The troughs 12 are shown by the cross sectional arrangement of FIG. 1. The troughs are comprised of mating half sections for example of two identical parabolic sections 14, 14 formed by being rotated symmetrically off an optical axis of the collection trough. The parabolic curve of each of the troughs is continuous to within two or three degrees of an exact center of the trough at which point the curve may degenerate into a circular curve at the bottom, as shown toward the peripheral edge of the curve. The focal point 16 of each of the curves is at a general point as shown and is, in the preferred embodiment, about ¾ inch above the bottom curvature of the trough 12 and is also found to be about ¼ inch from the vertical center line of the curve or half section. Thus a focal plane is created proximate ¾ inch from the bottom of the curve and about ¼ inch either side of a vertical center line thereof. There is then inserted into the trough in nesting relation a heat entrapment cylindrical tube 18 of glass and which extends the length of the trough, the cylindrical tube has a horizontal axis 20 that generally and approximately coincides with the line of focal points 16 extending throughout the trough. The heat entrapment tube may be of any transparent material such as glass and its inner surface may be coated with material for providing infrared light to be retroreflected back into the cylinder if it is not collected as will be described below. The trough in its conventional operation collects solar energy throughout is parabolic surface that passes within the trough and through a glass cover plate 22 so that it is directed toward the focal point 16, but should it pass through that point to the other side of the cylindrical tube 18, it will not exhaust the confines of the cylindrical tube but will be reflected back into the cylindrical tube due to the cylindrical inner surface.

Mounted within and along the vertical and horizontal central portion of the cylindrical tube 18 are metallic heat collector tubes that are approximately the length of the heat entrapment tube 18 and may be of approximately rectangular shape in cross section, the axis of the metallic tubes having their central point or axis encompassing both the line of focal points 16 and the axis 20 of the cylindrical tube 18, and so constructed for the conveyance of a working fluid passing therethrough. The working fluid is a hydrocarbon or a silicone mixture or any material of a super high temperature sensitive and responsive material so that upon impact of solar energy rays, the working fluid absorbs heat and its temperature is corresondingly raised in response thereto for conveying the absorbed heat from the trough to a heat exchange unit (not shown). The four tubes 22, 24, 26, 28 shown are connected at one end to an end of another tube with one heat collector tube 22 connected at one end to a fluid inlet 30 and one other tube 24 is connected with one end to an outlet 32 so that the fluid flows back and forth across the cylindrical tube. The inlet end of the one heat collector tube and the out end of the other heat collector tube are connected to inlet and outlet manifolds to form a continuous header.

It is seen that the heat entrapment tube 18 is comprised of a clear, transparent glass or similar material for energy transmission or admission therein and for supporting the heat collecting tubes centrally disposed therein. The heat collecting tubes are constructed generally of metal or copper with two of the tubes 26, 28 having a horizontal major axis and two of the tubes 22, 24 having a vertical major axis with a selectively disposed absorption coating for the reception of heat and for preventing heat from passing out through the surface of the tubes. This assembly is installed in the trough where inlet and outlet headers are attached to inlet 30 and outlet 32, respectively. The mirror of the parabolic surface concentrates all incoming energy on the four tubes. The outer tube of cylindrical construction provides evenly distributed heat and distribution that essentially and resultantly refocuses energy radiated from the fluid tube. The four fluid conducted tubes are enclosed in the outer cylindrical tube and the outer heat entrapment tube is evacuated and the ends are sealed to prevent vacuum leakage.

Figure 2:
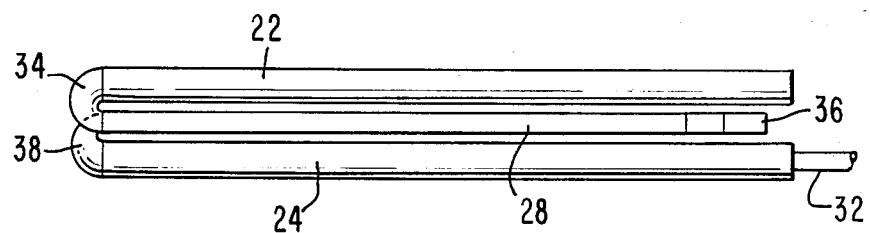
FIGS. 2 and 3 illustrate side and top views respectively of fluid conductor tubes assembled in the heat entrapment tube.
Figure 3:
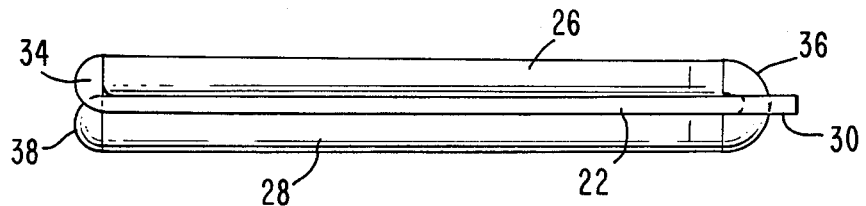
Figure 4:
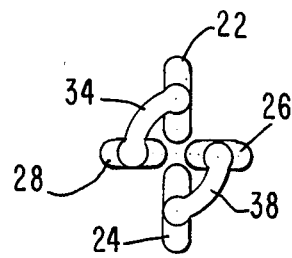
FIG. 4 is an end view of the heat collector tubes which show their connection.

FIGS. 2 and 3 show respectively side and top views of the four fluid conducting tubes 22, 24, 26 and 28. As shown, the tubes 22 and 24 have their major axis extending vertically with the tubes secured with their major axis on the vertical center line of the cylindrical tube 18. The tubes 26 and 28 are positioned with their major axis extending horizontally along a horizontal center line of the cylindrical tube 18. The fluid flow heat conducting tube 22 is provided with an inlet 30 at one end which introduces the heat conducting fluid into the collector. The opposite end of tube 22 is connected to an adjacent end of tube 28 by a 180° turn connector shown by line 34. The opposite end of tube 28 is connected by a second 180° turn connector 38 to the adjacent end of tube 24. The opposite end of tube 24 is connected by outlet 32 to the header such as set forth in the above noted patent applications.

In operation of the apparatus, heat collecting fluid enters the inlet 30 of tube 22 traverses tube 22 toward the left as shown and enters the adjacent left end of the tube 28 via the 180° turn connector 34. The fluid traverses tube 28 to the right and enters the adjacent right end of the tube 26 via 180° turn connector 36, the fluid then traverses tube 26 to the left and enters the adjacent left end of tube 24 via 180° turn connector 38. The fluid then traverses tube 24 to the right and through the outlet 32 to the header. The inlet end of each of the heat collectors of each trough are connected to an inlet manifold and the outlet of each heat collector is connected to an outlet manifold from which the hot fluid is directed to the place of usage.

The arrangement of the four heat collector tubes 22, 24, 26 and 28 function very efficiently during hazey or cloudy days as well as during very sunny days.

In this apparatus, the low density polymerized supporting concrete as set forth in copending application Ser. Nos. 640,068 and 650,470 is replaced by a nonflammable, high temperature temperature stable polyurethane foam 40 which is a good heat insulator and is commercially available from Arco Chemical, Dow Corning and others. The material is temperature stable to a minimum of 300° F. with a low to zero outgassing after curing.

In forming the improved supporting, heat insulated structure, a mold is sprayed with the polyurethane foam to the general shape as shown in FIG. 1 and allowed to cure. The foam panel is then removed from the mold and baked at a temperature of from about 200° for a period of about eight hours to substantially accelerate final curing. The foam panel is then trimmed to final measurements. An aluminum covering 42 is then applied to the outer surfaces for support and protection of the foam. The mirror reflective surfaces are then installed on the parabolic surfaces. The heat collector comprising the cylindrical tube 18 with the tubes 22, 24, 26 and 28 therein are then placed in the troughs, 12, connected to the headers and the glass cover plates are mounted over each trough.

This apparatus operates the same as in patent applications Ser. Nos. 640,068 and 650,470. The differences rely in the heat collector material. The parabolic reflectors are made the same as in the prior patent applications.

It is obvious that the heat collector set forth herein could be used in the supporting structor and reflective troughs as set forth in the prior applications since the heat collector does not depend upon a particular type of support material.

Alternatively, the mirrored parabolic surface may be made by sheet aluminum with a highly polished reflective surface roll formed to the compound parabolic cross section as shown in FIG. 1. In this alternative form, the compound parabolic reflective surface can be formed and secured in the aluminum frame 42 and the polyurethane foam can be blown in between the mirror surface and the aluminum frame. The foam is then allowed to cure, the foam adds rigidity and provides insulation. Once the supporting structure has been formed, the heat collectors and cover plates may be added.

Additional embodiments of the invention in this specification will occur to others and therefore it is intended that the scope of the invention be limited only by the appended claims and not by the embodiments described hereinabove. Accordingly, reference should be made to the following claims in determing the full scope of the invention.

What is claimed and desired to be secured by Letters Patent of the United States is:

1. A solar energy heat collector which comprises:
   an elongated cylindrical heat entrapment tube,
   a plurality of heat collector tubes secured within said cylindrical heat entrapment tube,
   said plurality of heat collector tubes including a first pair of oppositely disposed elongated substantially rectangular tubes secured relative to each other with their major axis extending in a horizontal direction,
   a second pair of oppositely disposed elongated substantially rectangular tubes secured relative to each other with their major axis extending in a vertical direction,
   each of said first and second pair of elongated substantially rectangular tubes being positioned with their center line on a plane passing through the center line of said cylindrical heat entrapment tube,
   one end of one of said heat collector tubes have an inlet connected thereto and one end of one of said second pair of heat collector tubes have an outlet connected thereto with said inlet and said outlet on the same end of said heat entrapment tube, and 180° turn connectors for interconnecting adjacent ends of one collector tube of each of said first and second pairs of collector tubes to each other excluding said ends connected to said inlet and said outlet
   a support,
   at least one trough in the support, said at least one trough having an internal reflective surface comprising two oppositely disposed truncated parabolic sections rotated away from its vertical axis to create a wide angle of acceptance opening, and a reflective circular face joining the ends of said two parabolic sections which are opposite said acceptance opening, said reflective surface being molded with said support, said internal reflective surface having a focal line to which said internal reflective surface reflects incident solar energy,
   said heat entrapment tube being located in said at least one trough at said focal line.

2. A solar energy heat collector as set forth in claim 1, wherein:
   said heat entrapment tube is made of glass, vacuum sealed and evacuated.

3. A solar energy heat collector as set forth in claim 2, in which:
   said heat entrapment tube is coated on its inner surface with an infrared reflective material.

4. A solar energy heat collector as set forth in claim 3, wherein:
   each of said heat collector tubes are coated with a radiation absorption material to facilitate heat reception by a heat absorption fluid which flows therethrough.

5. A solar energy heat collector as set forth in claim 1, in which:
   said support being formed of a polyurethane foam surrounded by a supporting covering.

6. A solar energy heat collector as set forth in claim 5, wherein:
   said supporting covering and said reflective surface of said trough are aluminum.

* * * * *